United States Patent [19]
Loveland

[11] 3,734,002
[45] May 22, 1973

[54] MEANS FOR PEELING PINEAPPLES

[75] Inventor: Malcolm W. Loveland, Orinda, Calif.

[73] Assignee: Atlas Pacific Engineering Company, Emeryville, Calif.

[22] Filed: Jan. 25, 1971

[21] Appl. No.: 109,324

Related U.S. Application Data

[60] Division of Ser. No. 852,251, Aug. 22, 1969, Pat. No. 3,638,696, which is a continuation-in-part of Ser. No. 612,584, Jan. 30, 1967, Pat. No. 3,473,588.

[52] U.S. Cl. .................................... 146/6, 146/43 R
[51] Int. Cl. ............................................. A23n 7/00
[58] Field of Search ................................. 146/6, 43 R

[56] References Cited

UNITED STATES PATENTS

| 3,001,562 | 9/1961 | Anderson | 146/43 R |
| 3,013,595 | 12/1961 | Boyce | 146/43 R |
| 3,420,284 | 1/1969 | Vadas | 146/6 |

Primary Examiner—Willie G. Abercrombie
Attorney—Robert H. Eckhoff

[57] ABSTRACT

Means are provided for peeling and preparing pineapples with a minimum of hand labor and a maximum yield of fruit for canning and other uses.

11 Claims, 21 Drawing Figures

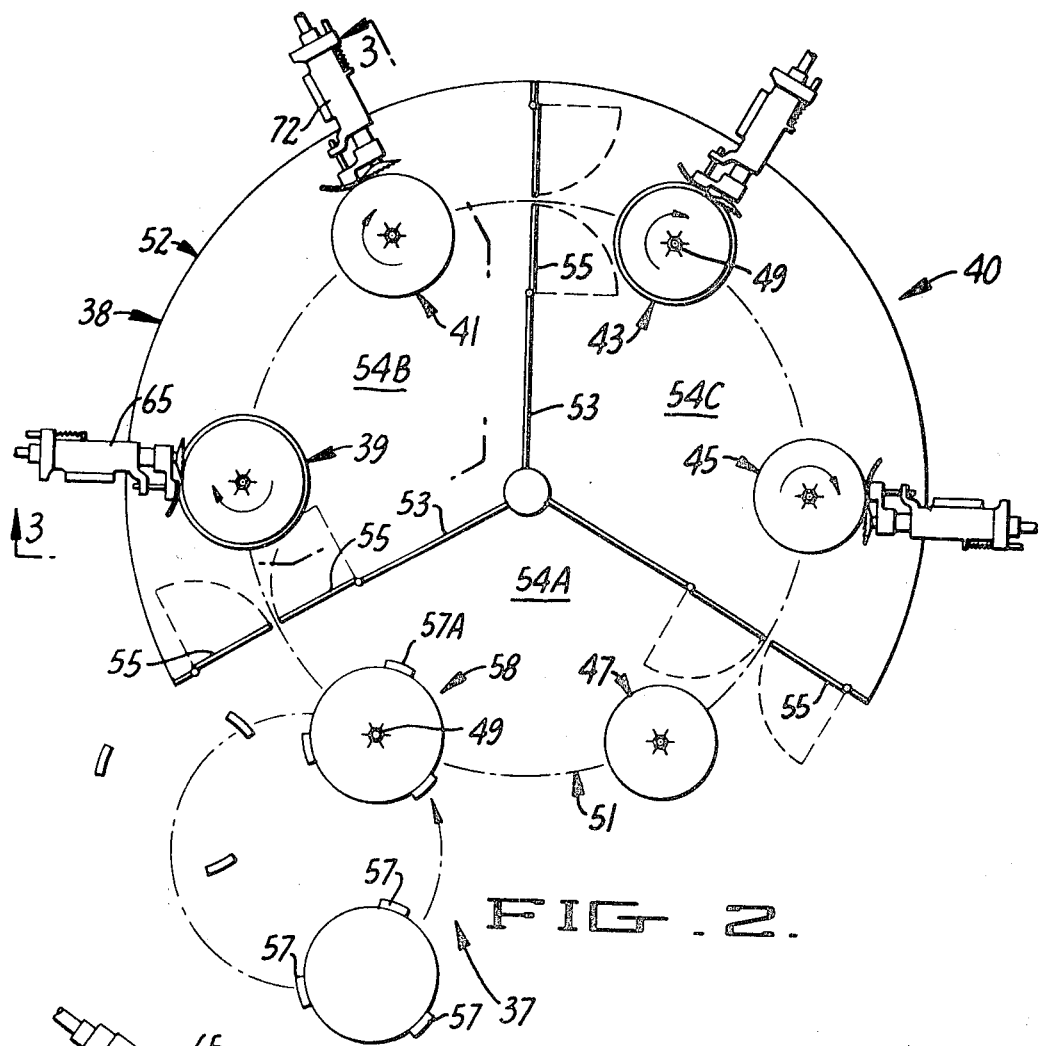
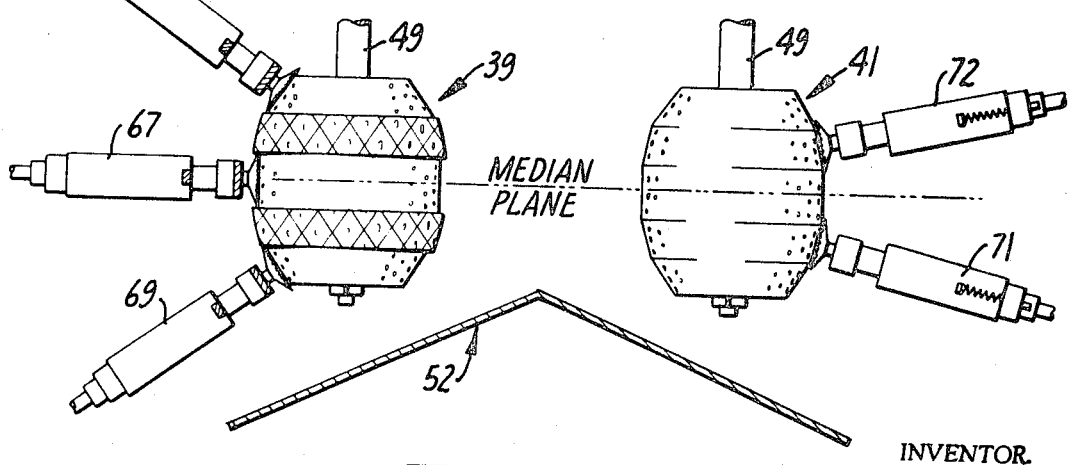

INVENTOR.
MALCOLM W. LOVELAND
BY
ATTORNEYS

PATENTED MAY 22 1973 3,734,002
SHEET 5 OF 7
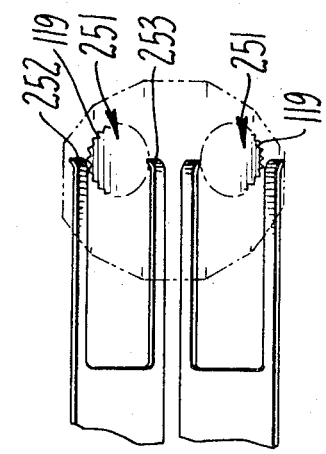
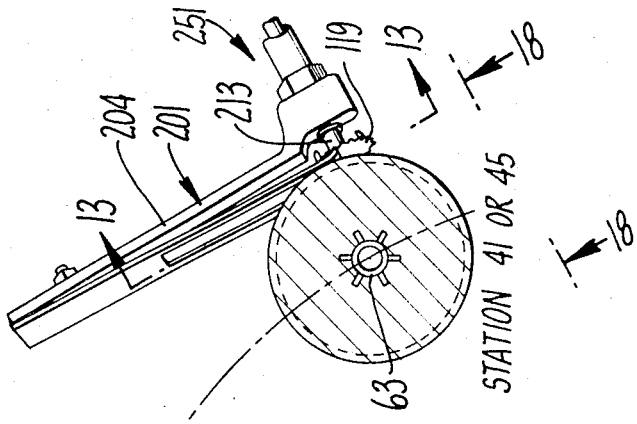
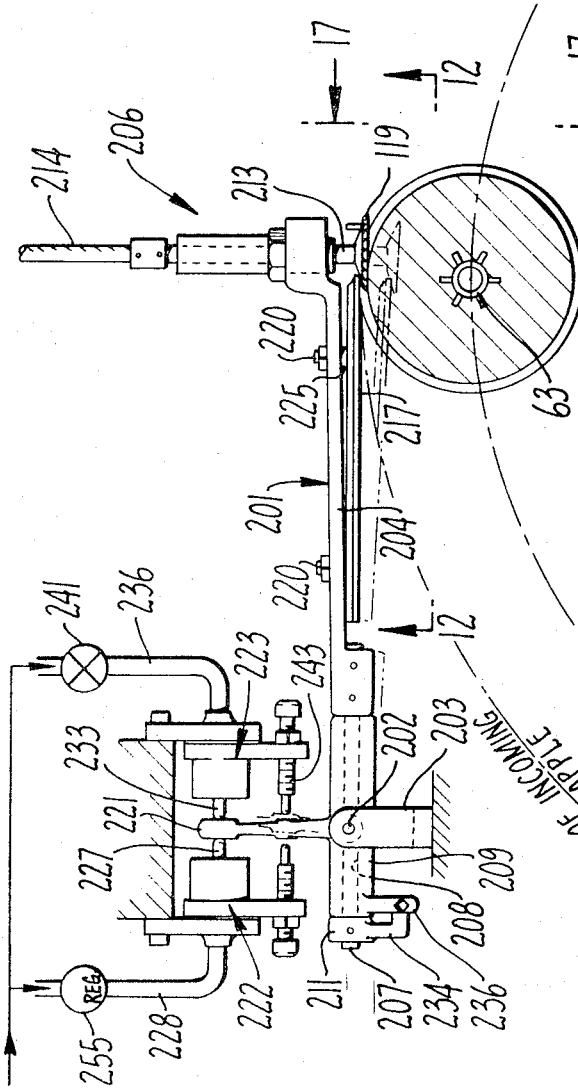
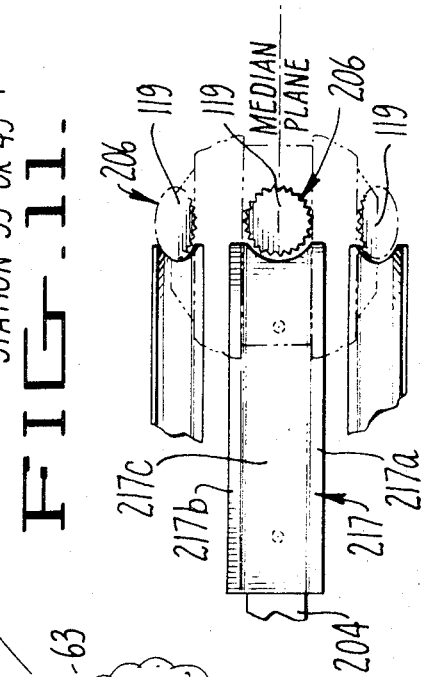
INVENTOR.
MALCOLM W. LOVELAND
BY
ATTORNEYS

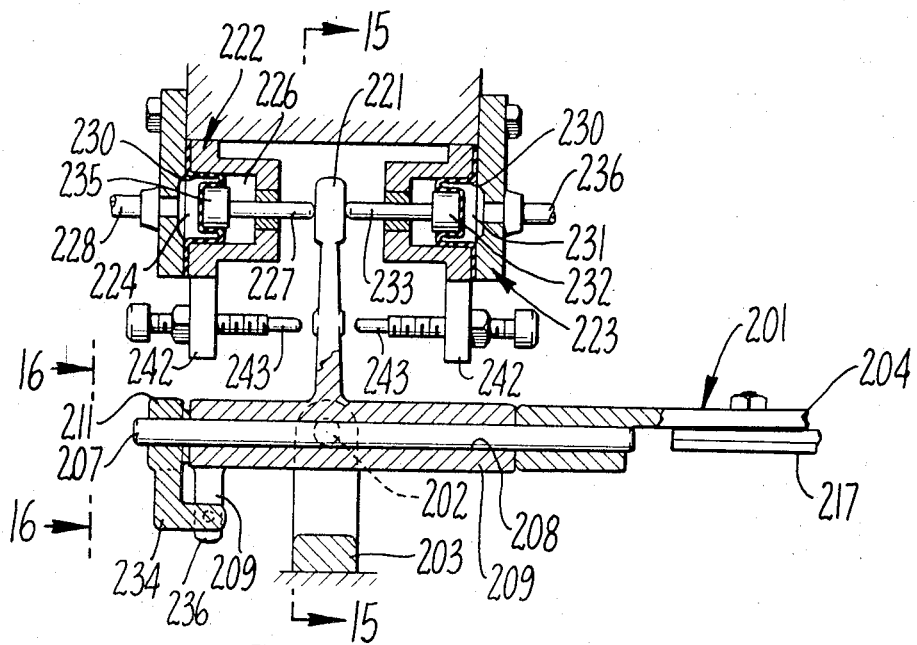
FIG. 14.
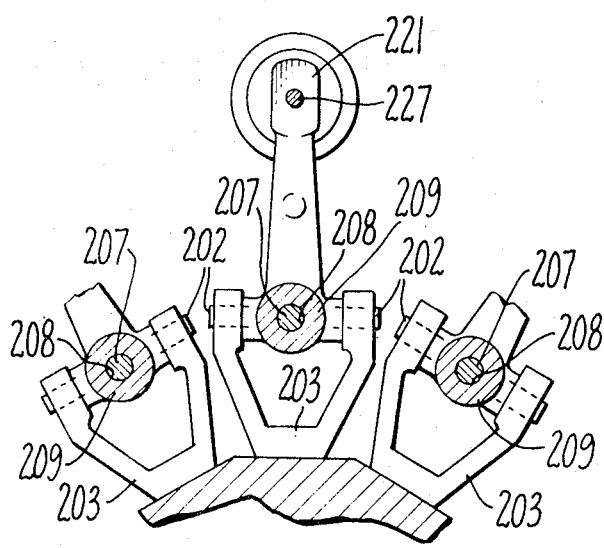
FIG. 15.
FIG. 16.
INVENTOR.
MALCOLM W. LOVELAND
BY
ATTORNEYS

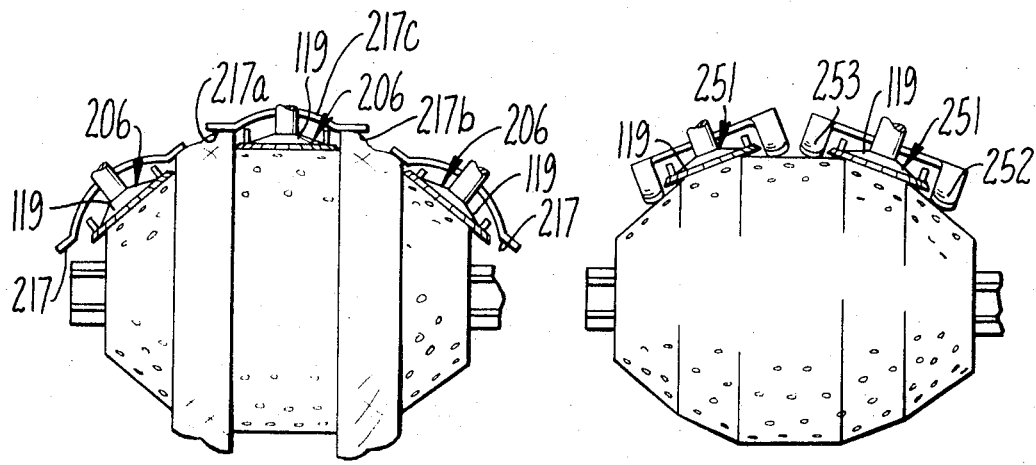
FIG.17. FIG.18.
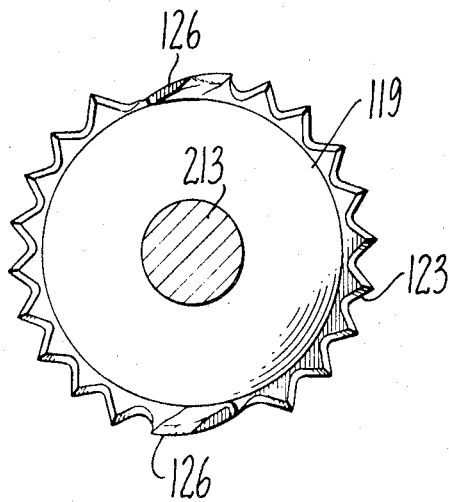 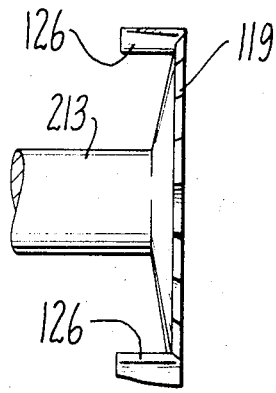
FIG.19. FIG.20.
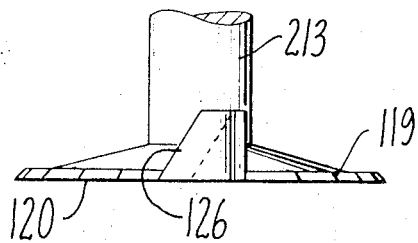
FIG.21.
INVENTOR.
MALCOLM W. LOVELAND
BY
ATTORNEYS

MEANS FOR PEELING PINEAPPLES

The present application is a division of U.S. Pat. application, Ser. No. 852,251, filed Aug. 22, 1969, now U.S. Pat. No. 3,638,696, which application is a continuation-in-part of my earlier application, Ser. No. 612,584, filed Jan. 30, 1967, now U.S. Pat. No. 3,473,588.

SUMMARY OF THE INVENTION

Heretofore pineapples have been prepared for canning by making a first cut to remove most of the outside and reduce the pineapple to a preliminary cylindrical size. Before the first cut, either or both of the butt end and the leafy crown end may or may not have been removed. After the first cut, a second cut is made to remove the woodlike core so that essentially all that remains is a hollow cylinder with the skin and eyes removed to a greater or less extent. In the interest of economy, the outer cylindrical cut is made of as large a diameter as possible. As a result, in the great bulk of the fruit, the eyes on the fruit are not removed at each end. This is because pineapples are ovoidal in shape with eyes extending about three-eighths inch deep and, if the fruit were cut to the smallest diameter, the waste would be too great. The machine on which these cylindrical cutting operations are performed is well-known in the art and is commonly referred to as a "GINACA;" see U.S. Pat. Nos. 1,039,926, 1,060,247, 1,060,248, 1,060,249, 1,060,250, 1,060,750, 1,065,309, 1,075,031 and 1,112,130.

The cutting of the pineapples on a Ginaca is subject to several objections. One is that any eyes remaining on the outer surface at both ends must be removed by hand trimming. This is a time consuming and an expensive operation. Another objection is the loss of good pineapple meat on the ovoidal shell cut from the fruit. Because so many eyes are present in any meat extracted from the shell, the only practical use to which this can be put is to press it to release the juice and recover this by filtration. The saleability of the juice is only at a low price and it moves slowly in the market place. Finally, the Ginaca machine is only useful on the large fruit.

In accordance with this invention, means are provided for peeling a pineapple in such fashion that the maximum amount of the pineapple is recovered in such form that it can be used as either sliced, chunk or crushed pineapple suitable for canning and wherein a minimum amount of the pineapple ends up in such form that it can be used only for juice or cattle feed. In one specific concept, the mechanism particularly contemplates selective peeling of separated areas of the pineapple by spaced peeling devices at different stations such that the spaced cutters can be selectively disposed about the periphery or contour of the pineapple to achieve its peeling with the removal of the minimum of the skin and eyes and yet to rid the inner meat of the pineapple from these, all with a minimum of hand trimming labor.

It is an object of the present invention to provide a novel form of mechanism for enabling a pineapple to be prepared for canning with the maximum economic utilization of its by-products.

The invention includes other objects and features of advantage some of which, together with the foregoing, will appear hereinafter wherein the present preferred mechanism of this invention is disclosed.

BRIEF DESCRIPTION OF THE DRAWINGS

In the drawings accompanying and forming a part of this specification:

FIG. 2 is a plan view of one form of apparatus which can be used in carrying out the present invention;

FIG. 3 is a side view on the line 3—3 of FIG. 2;

FIG. 11 is a side elevation illustrating a modified form of cutter support and its operation at two different peeling stations;

FIG. 12 is a view taken along the line 12—12 in FIG. 11 showing a typical array of cutters at the first station;

FIG. 13 is a view taken along the line 13—13 in FIG. 11 in which the righthand portion of FIG. 11 is a fragmentary view showing one of the cutters and guards operating at the second peeling station;

FIG. 14 is a side elevation, partly in section, showing in further detail the mechanism for manipulating the cutter and guard in relation to the fruit undergoing peeling;

FIG. 15 is a section taken along the line 15—15 in FIG. 14;

FIG. 16 is a view taken along the line 16—16 in FIG. 14;

FIG. 17 is a view illustrating the cutters making the first cut on the fruit;

FIG. 18 is a view showing the cutters making the second cut on the fruit;

FIG. 19 is a plan view showing the cutter employed;

FIG. 20 is a side view of the cutter shown in FIG. 19; and

FIG. 21 is another side view of the cutter shown in FIGS. 19 and 20.

DESCRIPTION OF THE PREFERRED EMBODIMENTS

Figure 1:
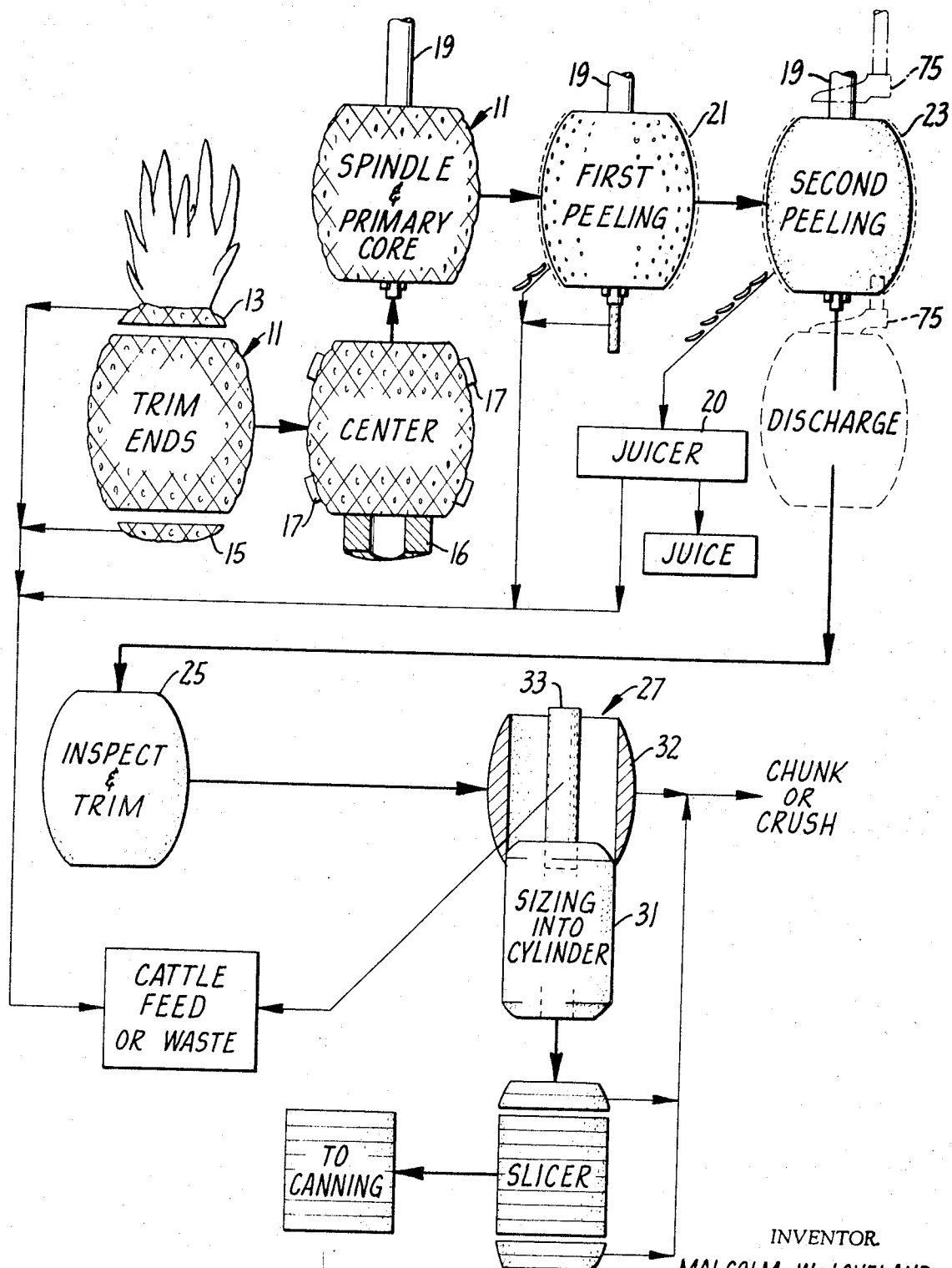
FIG. 1 is a diagrammatic view illustrating a method embodying the present invention.

Referring now to the drawings by reference characters, and particularly to the extreme lefthand representation in FIG. 1, there is shown a pineapple, generally designated 11, on which the first operation has been performed by a separate machine. This comprises cutting off of the top 13 and bottom 15 which parts contain little pineapple meat and which are sent to cattle feed or waste. Either or both of the top and bottom may be left on the fruit as desired for these each contain salvageable fruit flesh. The pineapple is then fed into the machine in which centering elements 17 center the pineapple. Pusher element 16 forces the centered fruit upward onto a hollow finned spindle 19 so that the median plane of the fruit is centered on the spindle. The impalement on the spindle results in an undersize core hole being cut through the pineapple. Thereafter the pineapple is passed through a first zone wherein it is given a first peeling as at 21 and the primary core is ejected. The first peeling 21 takes off a rough cut about three-sixteenths inch deep, the skin and most of the rough outside portion of the pineapple being removed with a minimum of the fruit. This rough material may have the juice extracted or be used as cattle feed or sent to waste.

At this stage, the pineapple still has part of the indentations of the eyes. The pineapple is then passed through a second zone where it is given a second peeling 23 also about three-sixteenths deep. This removes substantially all the eyes and imperfections, leaving the pineapple substantially ready for canning or other further processing. The pineapple is forced off the coring spindle 19 by presser foot 75 and is sent to an inspection station 25. The material removed by the second peel is sent to a juicer 20, the juice being recovered and the solid sent to waste or cattle feed. The pineapple is inspected at station 25 and, if a small amount of hand trimming is necessary, it may be done at this station.

The pineapple is now passed to station 27 where it is sized into a cylinder and the primary core hole enlarged to full size. The hollow cylinder 31 is subject to further operations such as slicing. The outer annular portion 32 which has been cut off is sent to further operations for producing crushed or chunk pineapple, while the hollow cylindrical secondary core 33 is sent to cattle feed or to waste. This more advantageous economic use is possible because the outer annular portion 32 is free from imperfections, as contrasted with the annular portion left after the operation of the Ginaca machine, which portion is only suitable for juice or cattle feed. It is believed apparent from the above generalized description that the method of the present invention produces the greatest amount of usable pineapple and the minimum amount of cattle feed and juice and this with a minimum amount of hand labor.

In FIG. 2, there is shown one form of apparatus for performing the method of the present invention. The machine illustrated has six spindles which are moved stepwise from one station to the next by a suitable indexing mechanism which is well-known in the art and therefore is not shown or otherwise described herein. These include a loading station 37, a rough peeling station 38 having two peeling locations 39 and 41, a finish peeling station 40 having two peeling locations 43 and 45, and an unloading station 47. The six spindles 49 are advanced from one station to the next under control of the indexing mechanism, making one revolution in each peeling location before moving to the next; the spindles are not rotated at the loading and unloading stations 37 and 47.

The spindles 49 depend from a rotating disc or table 51 above a chute structure 52. The chute structure is divided into three separate compartments 54A, B and C by the partitions 53 so that each operation is conducted in a separate compartment to enable the several by-products to be kept separate from one another. The partitions 53 having swinging doors 55 to permit the pineapples to pass from one station to the next. Suitably, the doors 55 may be merely spring loaded and are pushed open by the pineapples as they move from one station to the next or they may be positively power actuated.

At the loading station 37, a plurality of spring loaded centering fingers 57 are provided to grasp and center a pineapple which has been fed by hand or by machine with its core axis vertical. The fingers then move in time with the disc 51 from loading station 37 to the station designated 58. At station 58 the pineapple is directly under a spindle 49. In position 58, the pineapple is pushed upwardly through fingers 57 and is impaled on the spindle 49 until its median plane is substantially in the plane of the middle peeling unit 67 as in FIG. 3. Fingers 57 and spindle 49 correspond respectively to the centering elements 17 and the spindle 19 described in the operation set forth in connection with FIG. 1.

Figure 7:
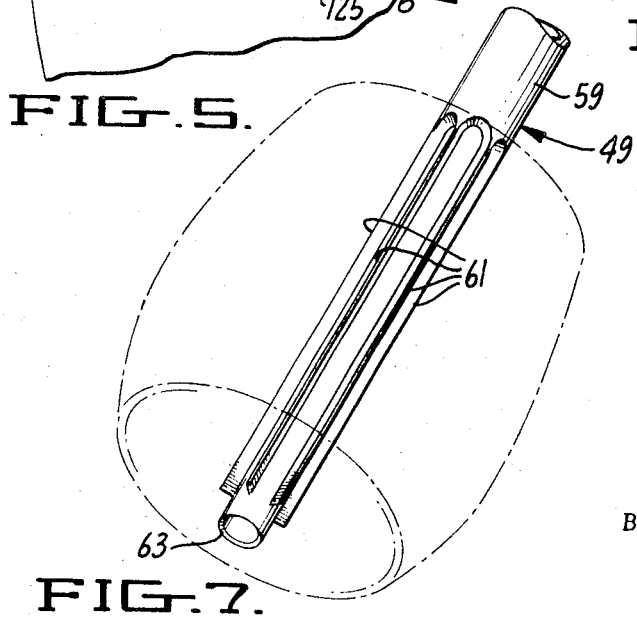
FIG. 7 is a perspective view of a pineapple showing one form of a spindle which may be utilized during the peeling operation.

A suitable form of spindle 49 is shown in enlarged form in FIG. 7. The spindle comprises a hollow shaft 59 with a series of flutes or fins 61 thereon and having a sharpened end 63. As the pineapple is impaled on the spindle, the sharpened end cuts an undersize primary core which is thereafter ejected in the first peeling compartment 54B. The outside diameter of the flutes 61 is somewhat smaller than the ultimate core of the pineapple to be removed in a later operation, so no usable portion of the pineapple is harmed by impalement on the spindle.

After the pineapple has been impaled on a spindle, it is moved through the series of stations (clockwise in the embodiment illustrated) by a suitable indexing mechanism. The first of these is station 38 having peeling locations 39 and 41 at each of which the pineapple makes one revolution while undergoing peeling. Locations 39 and 41 are rough skin peeling locations at which the first rough peeling previously described is made in two stages. As is shown in FIG. 3, cutter heads 65, 67 and 69 operate at station 39 while cutter heads 71 and 72 operate at station 41. The cutter structures will be hereinafter described in detail but at this point it will suffice to say that the three cutter heads 65, 67 and 69 make a top, central and bottom cut respectively leaving two bands of uncut skin while cutter heads 71 and 72 thereafter removed the two theretofore uncut bands. This initial cut penetrates about three-sixteenths inch and removes substantially all skin and a greater portion of the eyes. The cut material is collected by the chute 52 and ordinarily is used for cattle feed or sent to waste.

After cutting at the two locations 39 and 41, the pineapple passes to station 43 and then to station 45 where another cut is taken off at each stage to provide the second finish peeling previously described, again in two stages. The cuts at this station are again made in bands as at the previous station and as is shown in FIG. 3. This finished cut is also about three-sixteenths inch deep and, since a considerable amount of flesh is taken on the second cutting, this material can be collected and used for juice. At this point, the pineapple still has the characteristic pineapple shape but is free of all skin and all but unusually deep eyes.

In the above, it has been assumed that two cuts, first one with three cutters and the second with two cutters, would provide both the rough and finish cuts, but it will be apparent that this is for illustration purposes only and that other numbers of cutting heads might be employed. Ordinarily five heads would be about a minimum and larger pineapples might require more cutting heads for operation at any one time. Also if the canner does not wish to keep the material from the rough cut at stations 39 and 41, separate from the finish cut material of stations 43 and 45, one cut only can be made at stations 39 and 41.

Figure 8:
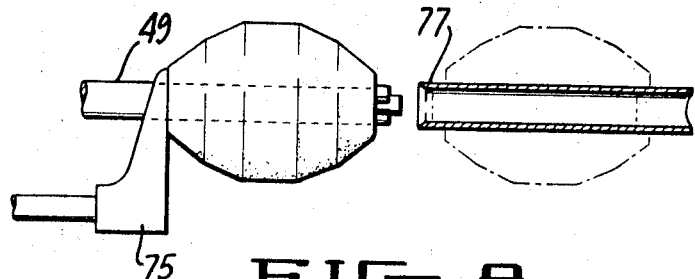
FIG. 8 is a diagrammatic view showing the method of removing the pineapple from the peeling spindle and forcing it onto a coring tube.

After the two series of cutting operations, the pineapple then passes to station 47. The operation at this station may include a further secondary coring and in any case the pineapple is finally discharged at this station. The secondary coring operation is shown in diagrammatic form in FIG. 8. Here the pineapple is shown impaled on the spindle 49 and a presser foot 75 is employed to press the pineapple off of the spindle 49. The pineapple may be discharged from the machine or pressed onto a coring tube 77 and thus into the position shown in broken lines to the right of FIG. 8. It will be seen that the end of the coring tube 77 has a sharpened end and cuts out a core which is larger in diameter than the flutes on the spindle 49 and fully encompasses the central core fiber of the fruit. The fully cored and peeled fruit is then moved off the core tube 77 and the core ejected by a separate mechanism not shown.

Figure 9:
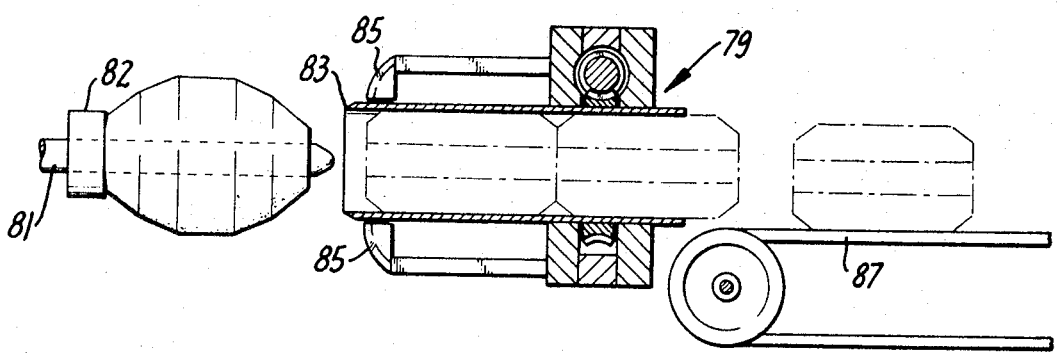
FIG. 9 is a side view of the method of cutting the pineapple to size preparatory to canning.

The peeled and fully or partially cored fruit is delivered to an inspection station whereat any hand trimming required is provided. The inspected and trimmed fruit is then passed to a sizing machine, generally designated 79, FIG. 9. The pineapple is placed on and is carried by a rod 81 which fits in the core hole in the fruit. Pusher element 82 is slidable on rod 31 and serves to force the fruit into the sharpened cylinder 83 which may be rotating. This cuts the fruit into a cylinder which is the size of the can in which the fruit is to be packaged. If the fruit was not fully cored as it was discharged from the peeling machine, an internal cylindrical cut can be made simultaneously with the external cylindrical cut. Methods for cutting both the external and internal cylindrical cuts are well-known in the art. In addition, radial blades 85 may be employed to sever the annular portion into two or more segments for easier handling. The pineapple then passes onto a conveyor 87 to be sliced or otherwise processed.

Figure 10:
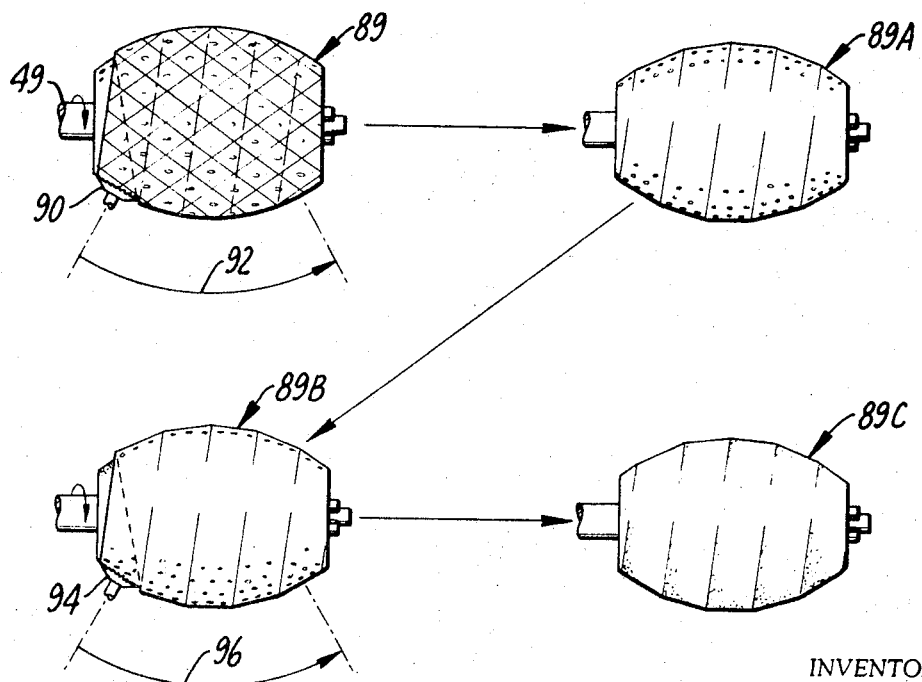
FIG. 10 is a diagrammatic view showing a method of spiral peeling which forms another embodiment of the present invention.

In FIG. 10 an alternate embodiment of the invention is shown. Here a pineapple 89 is held on a rotating spindle 49 and a first cutting head 90 is moved through an arc 92 to perform the initial cutting operation. Thus, the pineapple shown at 89A has a spiral cut thereon and has been peeled to remove the rough skin. The pineapple then passes to the position shown at 89B whereupon a second cutting head 94 makes a second pass through the arc 96 completing the peeling operation, producing the pineapple shown at 89C and which has substantially all of its eyes removed and which is in substantially the same condition the pineapple processed in accordance with the first described embodiment. The peeling heads 90 and 94 may be at separate stations or may be the same head making a forward and return cut each about three-sixteenths inch deep. By utilizing two peeling operations at different stations, the cuttings can be collected separately and used to their greatest economic advantage.

In FIGS. 4 through 6 and 19 through 21, one of the cutting heads is illustrated. The cutter head has generally been designated 91 and comprises a body 93 adjustably mounted on a bracket 102 so that the base of a rotary cutter 119 will be substantially parallel to the tangent to the outer surface of a pineapple and its cutting edge substantially on the centerline of the pineapple. Within body 93, sleeve 113 is slidably mounted in bushings 107. A split collar 104, clamped on the end of sleeve 113, has one or more slots 105 in its outer face. Piston shaft 99 engages one of the slots 105 to prevent rotation of the collar and its attached sleeve 113. The piston and cylinder assembly 97 is supplied with a regulated and controlled air pressure to urge the sleeve 113 and shaft assembly toward the fruit with a steady pressure when air pressure is applied. When the air is not applied, spring 101 retracts the assembly from the fruit. The on-off sequence is controlled by an automatic valve, not shown, which relates the application of air to the revolution of the fruit. By retracting the piston rod 99 from one of slots 105, the sleeve 113 may be rotated to cause the guard assembly, generally indicated at 115, to advance toward or recede from the end of the sleeve 113, thus controlling the depth of cut. Reengagement of piston rod 99 and a slot 105 prevents further rotation of sleeve 113. Shaft 109 is mounted for rotation within sleeve 113 on bushings 110. The shaft 109 is prevented from moving axially within sleeve 113 by collar 106 and flange 108. Shaft 109 is rotated by a suitable drive such as a flexible shaft, not illustrated.

The guard assembly 115 is threaded onto sleeve 113 and is prevented from rotating by pin 117 slidably engaged with body 93. Mounted on shaft 109 is cutter 119 which has a series of sawlike teeth 121. Face 120 on the cutter 119 in contact with the fruit is smooth so that it cannot cut into the fruit axially when it is rotated. The teeth 121 are sharpened on the face opposite the face 120. In addition to the teeth 121, projections 126 are provided on the opposite side of face 120. The saw teeth sever the fibers of the pineapple and lift a ribbon of peel while the projections 126 which are sharpened on their leading edge cut the ribbon or peel into segments about one-fourth inch long depending on the speed of cutter and pineapple rotation.

Figures 5, 6:
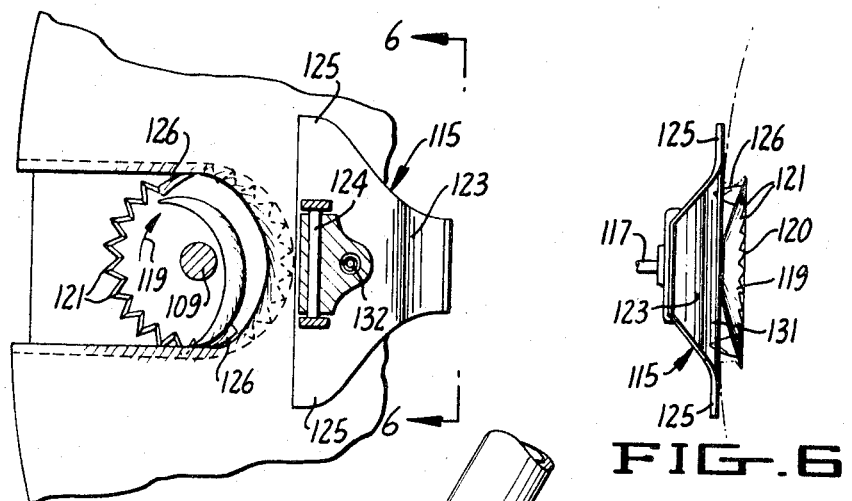
FIG. 5 is an end view generally on the line 5—5 of FIG. 4 but showing the blade rotated 90° from the position shown in FIG. 4.
FIG. 6 is a section through the cutting mechanism on the line 6—6 of FIG. 5.

The cutter described has no end cutting characteristics, being designed to cut only laterally. The bottom face 120 is substantially planar so that it rests tangentially on the cut surface on the pineapple without significant penetration. The V-shaped teeth 121, as is shown in FIGS. 5 and 19, are shown as sharpened only on their upper faces. Both the leading edge and the trailing edge are shown as sharpened but only the leading edge need be sharpened; so they produce a cut along the tangent line as the pineapple is rotated. When in cutting position, each cutter is positioned so that the roots of the leading teeth are approximately at the tangent point to the surface of the fruit. As the pineapple rotates, the V-shaped teeth sever the fibers and lift a layer of skin or meat to the depth desired. The vertical projections or spurs 126 are sloped rearwardly to provide a self-cleaning action. They are sharpened on their leading edges and project high enough to always sever the cut layer into short lengths, approximately one-fourth inch long for easy disposal. The speed of the cutter and of the pineapple is regulated to produce the desired length of chip. The outer periphery of the spurs 126 are formed as a spiral to provide proper cutting clearance as the spurs advance through the ribbon of peeling.

Figure 4:
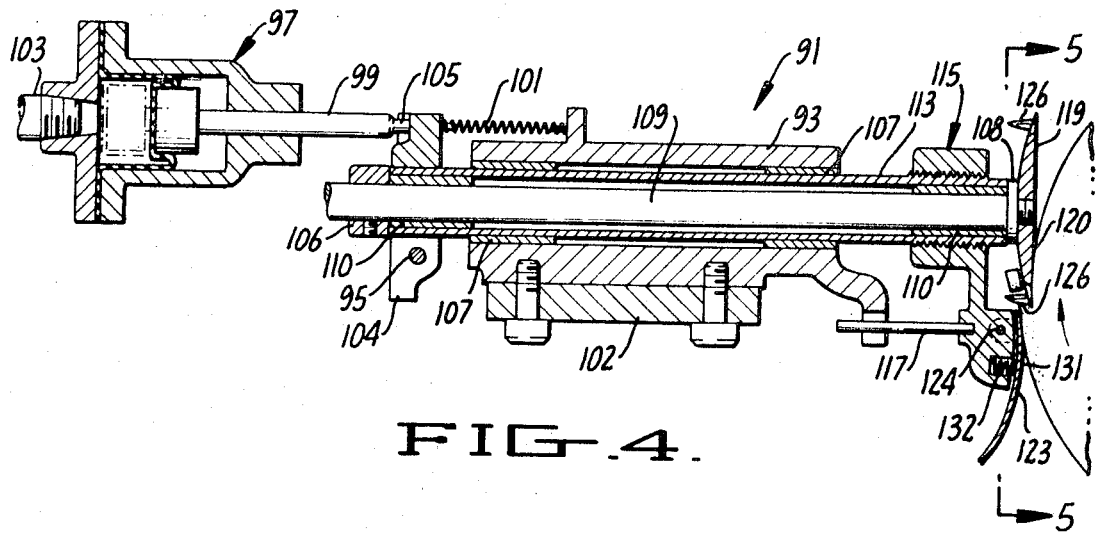
FIG. 4 is an enlarged sectional view of one form of cutting head which could be used in carrying out the present invention.

The guard member 115 carries a depth gage 123 which regulates the depth of the cut. The gage includes a foot 131 pivoted at 124 and pressed by spring 132 to engage the fruit. The foot 131 projects forwardly beyond the path of the cutter. This action can best be seen in FIG. 4. Further, as is shown in FIG. 5, the gage 123 may have wings 125 on either side and which ride on the uncut portion of the pineapple as is best seen in FIGS. 5 and 6. These wings are particularly valuable when making the first cut of a series such as at stations 39 and 43. In making the second cut, as at stations 41 and 45, the guard rides over the uncut surface to regulate the depth of cut, as is best seen in FIG. 4.

Although certain specific equipment has been illustrated, it will be understood that this is for purposes of illustration only and that many variations can be made in the apparatus without departing from the spirit of this invention. For instance, in FIG. 2 it is shown that the cutters are stationary and that the spindles rotate in a fixed position in front of the stationary cutters. However, it could easily be arranged so that the cutters would move along from one station to the next with the spindles 49. This would be particularly valuable in carrying out the embodiment shown in FIG. 10 wherein two spiral cuts can be made with a single cutter rather than with two cutters as described above. Further, it has been shown in FIG. 2. that two separate stations are used for the initial peeling cut and two more stations for the finished cut. It is obvious that the entire cutting operation could be done at two stations. Instead of cutting the peeling and the remainder of the eyes in separate operations, a single cut about three-eighths inch deep can be made. Such a single cut can be made either in bands, as shown in FIG. 3, or as a spiral, as is shown in FIG. 10.

In FIG. 11, I have shown a modified form of device in which each cutter 119 can pivot and swivel in such manner that it adapts to and follows closely the actual contour of the pineapple. This structure includes a lever 201 pivoted as at 202 upon a support 203. The lever is a composite structure including an arm portion 204 upon which a guard and a cutter head, generally indicated at 206, are mounted. The arm 204 includes a rod 207 which extends rotatably through a passage 208 in the swivel 209, the rod 207 being secured in position by collar 211.

The arm is mounted in the swivel 209 so that it may swivel to permit the cutter and guard to adapt to the varying axial contour of the pineapple. The degree of swivel in either direction from a nominal setting is limited by a collar 211 which has an extension 234 which fits between ears 236 which extends from swivel 209 (FIG. 16). Screws 238 extend from each ear to permit adjustment of the extent of swivel movement of the arm portion of lever 201.

Each cutter head includes a toothed cutter 119 mounted on one end of a rotatable shaft 213, the latter in turn being connected to a rotatable flexible shaft 214. The shaft 213 is constrained from axial movement within the cutter head. A guard 217 is adjustably mounted upon the cutter head by screws 220 and a spacer 225 to control the depth of cut of the cutter. The guard 217 is a composite structure including opposite outside guard surfaces 217a and 217b and an upwardly extending central portion 217c (FIGS. 12 and 17). During the first cut at the first station (either 39 or 43), the guard surfaces 217a and 217b ride on the surface of the pineapple adjacent to the cutter when the first peeling is effected as is shown in FIGS. 12 and 17. The guard 217 also extends rearwardly from the cutter for such a distance that it will engage a pineapple as this is moved into position for peeling as is shown in FIG. 11 by the phantom lines indicating the position occupied by the cutter head in the absence of a pineapple. The early contact of the incoming pineapple with the guard 217 swivels the cutter head to be tangent with the axial contour of the pineapple before the cutter is brought into engagement with the pineapple. The engagement of the cutter with the pineapple is substantially lateral to the cutter axis.

Pressure to hold the cutter head 206 in engagement with the pineapple is achieved by provision of an arm 221 which extends upwardly from the swivel 209 above pivot 202. The arm is moved under the control of two air cylinder devices, generally indicated at 222 and 223. Device 222 includes a piston 235 movable in cylinder 226, the piston having a rod 227 extending therefrom to engage one side of the arm 221. The piston chamber 224 is supplied with air under constant but adjustable pressure from line 228, the force applied by the air cylinder device 222 being such that a constant but adjustable pressure is applied by the cutter to the pineapple under the control of regulator 255. The seal between the piston and cylinder is by means of a convoluted diaphragm 230.

The air cylinder device 223 also includes a chamber 231 in which piston 232 is provided, the latter having a piston rod 233 extending therefrom to engage the other side of the arm 221. This air cylinder device structure is supplied with air from line 236. When the pineapple has made one full revolution, a quick acting valve 241 is actuated to supply air at a pressure, higher than the pressure received by cylinder 222, such that piston rod 233 moves the cutter out of engagement with the pineapple. Thereafter, valve 241 is moved to vent air from the air cylinder device 223 so that air cylinder device 222 becomes effective. Each air cylinder has a depending arm 242 carrying adjustable stops 243 which limit the travel of arm 221.

As appears in FIGS. 12, 13, 17 and 18, several cutter heads like cutter head 206 are provided on the support structure described in connection with FIG. 11 and wherein (FIG. 11) the several cutters cut spaced annular areas on the fruit at one of the first locations 39 and 43 leaving uncut annular areas on the fruit. These uncut areas are later cut by cutters 119 as are shown in FIGS. 13 and 18 at one of the second locations 41 and 45. The cutter heads 251, however, include guard surfaces 252 and 253 on either side which ride on the previously peeled area so the fruit is peeled to a depth to blend with the first annular cuts.

In the swivel head form of a cutter support shown in FIG. 11, each head can swivel to adjust its attitude so the cutter is tangent to the axial contour of the pineapple. At locations 39 or 43 and 41 or 45, the guard surfaces bear on fruit areas on each side of the path made by the cutter. This provides a greater moment arm to swivel the head into the proper tangent attitude to the fruit. The limitation of the degree of swivel movement by collar 211, extension 234 and ears 236 (FIG. 16) is effective to maintain the cutter head in approximately the correct attitude so that the incoming pineapple is able to make the final correction. In addition, should the shape or size of the pineapple be such that both lateral surfaces of the guards of the outside cutters at locations 39 or 43 do not bear on the fruit, as shown in FIG. 17, then the swivel limitation prevents the cutter head from swiveling too far.

In the case of the second cut station as at 41 and 45, the guards bear on the previously cut fruit surface and the area to be peeled projects higher, therefore the portion of the guard between the contrast points must be removed to permit that part to project and be cut by the cutter. The length of the guards is such that the pineapple approaching a peeling station pre-swivels the head so that the attitude of the cutter is correct before the cutter actually engages the fruit as is shown in FIG. 11.

It is preferred to make each end cut and the middle cut on the pineapple during the first pass (FIG. 17). This provides an opportunity to use the split design guards which take their bearing on the fruit from the surface produced by the preceding cutters and results in a more uniform blending of the adjacent passes. The structure described possesses the advantage that each cutter follows the contour of the pineapple quite closely even though such contour may vary from fruit to fruit. This is a feature of advantage because pineapples vary substantially in shape and size.

I claim:

1. A rotary cutter comprising: a planar disc supported on an end of a shaft, the disc having a plurality of V-shaped teeth disposed about the periphery of the disc having at least the leading edge thereof sharpened to provide a cutting surface, and at least one upstanding spur disposed on a side of the disc substantially normal to the disc and having a sharp leading edge.

2. A rotary cutter for peeling fruit comprising a disc supported for rotation on the end of a shaft, said disc having a smooth face opposite the shaft, to prevent said cutter from cutting axially into the fruit, a plurality of V-shaped teeth disposed about the periphery of the disc having at least the leading edge thereof sharpened to provide a cutting surface, and at least one spur disposed on the face opposite the smooth face and substantially normal to the disc and having a sharp leading edge sloping rearwardly from direction of rotation and of sufficient height to cut through the peeling produced by the teeth.

3. A cutter as in claim 1 with a peeling depth control gage surface disposed on the leading side of the toothed periphery and closely adjacent to the toothed periphery.

4. A cutter and gage as in claim 3, said gage having a surface projecting laterally beyond the path of the cutter and on each side thereof.

5. A cutter and gage as in claim 4 wherein the gage has a limited spring biased float.

6. A pineapple cutter device comprising an annular disc having a lower planar face to ride over the cut surface of a pineapple, a plurality of V-shaped teeth formed about the periphery of the disc, each of said teeth having a sharpened leading face sloping upwardly and away from the lower face of the disc and in a direction opposite to the direction of rotation of said disc.

7. A cutter device as in claim 6 wherein a pair of spurs are provided on opposite sides of the disc extending away from and substantially normal to the lower face of the disc and each having a sharp leading edge.

8. A pineapple cutter structure including a rotary cutter having a lower substantially planar face and a plurality of V-shaped teeth thereon formed about the circular periphery of the cutter having at least the leading edge thereof sharpened to provide a cutting surface, means mounting the cutter for rotation, means supporting the mounting means for a limited swivel action to enable the rotary cutter to cut a surface substantially parallel to an axial tangent to the surface of the fruit undergoing peeling, and guard means extending forwardly of the cutter to pre-swivel the cutter into a position wherein the lower face of the cutter is substantially parallel to an axial tangent to the surface of the fruit.

9. A pineapple cutter as in claim 8 wherein the cutter mounting means is moved into and out of a position wherein the cutter is in cutting engagement with a pineapple by a first and by a second cylinder and piston structure, the first cylinder and piston structure holding the cutter against the pineapple during peeling by the cutter with a regulated degree of pressure, the second cylinder and piston structure moving the cutter out of peeling engagement with the pineapple upon completion of the peeling operation.

10. A cutter assembly comprising a rotary cutter having a substantially planar underface thereon, the cutter being circular and having a plurality of V-shaped teeth about the periphery thereof, an arm supporting the cutter at one end of the arm, the other end of the arm being mounted for a limited turning movement in a swivel, a guard means to control the depth of peeling, said guard means being mounted on the arm and having pineapple engaging surfaces extending laterally on both sides of the path cut by the cutter on the pineapple to engage the pineapple on opposite sides of the cutter to turn the arm and the cutter thereon to engage the pineapple with the planar face of the cutter substantially parallel to the axial tangent to the pineapple at the point whereat the cutter cuts the pineapple.

11. A pineapple peeler as in claim 10 including a spindle upon which a pineapple is impaled with its axis aligned with the axis of the spindle and with its median plane in a predetermined position on the spindle, means for indexing the spindle over a circular path which includes a first and a second peeling station, and the fruit contacting surfaces on each guard associated with each cutter are of a length sufficient to engage an impaled pineapple and move the cutter into cutting attitude with the pineapple as the spindle is moved toward and finally into each of said stations.

* * * * *